(12) United States Patent
Babin et al.

(10) Patent No.: US 6,588,089 B2
(45) Date of Patent: Jul. 8, 2003

(54) METHOD OF MOUNTING SERVO MOTOR

(75) Inventors: Christopher J. Babin, Sterling Heights, MI (US); Robert D. Erfurt, Sterling Heights, MI (US); Eugene F. Moody, Waterford, MI (US); Kelly M. Newby, Riley Township, MI (US); Steven K. Meier, Portage, MI (US); Todd C. Woods, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/876,330

(22) Filed: Jun. 7, 2001

(65) Prior Publication Data

US 2002/0184760 A1 Dec. 12, 2002

(51) Int. Cl.[7] .................. H02K 15/00; B23P 19/00; H01R 43/00; A47L 11/00
(52) U.S. Cl. .............. 29/596; 29/732; 29/883; 15/412; 310/71
(58) Field of Search .................. 29/596, 732, 883, 29/884; 310/71; 15/412; 248/638

(56) References Cited

U.S. PATENT DOCUMENTS

| | | | | |
|---|---|---|---|---|
| 4,116,410 A | * | 9/1978 | Boyd et al. ............ | 248/581 |
| 4,775,273 A | * | 10/1988 | Bauer ................... | 403/377 |
| 5,511,282 A | * | 4/1996 | Metzger et al. ........ | 15/351 |
| 5,749,737 A | * | 5/1998 | Zuin .................... | 439/500 |
| 5,937,507 A | * | 8/1999 | Asakura et al. ....... | 29/596 |
| 5,986,367 A | * | 11/1999 | Tsuzaki et al. ....... | 310/40 MM |

* cited by examiner

*Primary Examiner*—Carl J. Arbes
*Assistant Examiner*—Tim Phan
(74) *Attorney, Agent, or Firm*—Roger A. Johnston

(57) ABSTRACT

A sub-fractional Horsepower motor, intended for use with a worm on its output shaft, is positioned adjacent a servo actuator housing with the motor shaft disposed adjacent to and oriented generally parallel to the housing. The housing is provided with a resiliently deflectable rear motor mounting stanchion having a camming surface and a front motor mounting stanchion, both preferably formed integrally as a one-piece member with the housing. Upon assembly into the housing, the motor is maintained in its parallel orientation and moved in a single direction normal to the shaft to contact the camming surfaces, on the rear stanchion and deflects and snap-locks into the stanchion and the rear stanchion biases the motor axially such that the opposite shaft end of the motor registers against one surface of the front stanchion. A limit stop is provided and located in the housing from the one surface of the front stanchion for limiting axial movement of the motor shaft when the motor worm is engaged with a worm gear in housing.

6 Claims, 3 Drawing Sheets

METHOD OF MOUNTING SERVO MOTOR

BACKGROUND OF THE INVENTION

The present invention relates to servo actuators of the type employing a low voltage high RPM direct current motor of the relatively low torque sub-fractional horsepower variety. Such devices are commonly employed in motor vehicles for power seat adjustment, movement of engine coolant valves and other valves employed in engine and emission control systems. In such motor vehicle applications, it is known to have the high RPM, low torque motor engage a speed reducer, commonly a gear train, mounted in a common housing with the motor. Where a numerically high ratio of speed reduction or torque multiplication is required, it has been found convenient and desirable to employ a worm on the motor shaft to engage a worm gear for the first stage of speed reduction or torque multiplication.

Where a worm driven speed reducer is employed, the torque reaction of the worm gear on the motor shaft in the axial direction has been found to apply undue thrust loads on the motor bearings and to cause problems with wear of the motor bearings and also to cause a prohibitive amount of noise during operation of the servomotor.

Furthermore, upon assembly of the motor into the servo actuator housing and into engagement with the gear train, it has been required to assemble the motor manually into the housing by first tilting the motor with respect to the housing to engage one end of the motor and then to secure the opposite end of the motor with the drive worm thereon into the housing for engagement with the worm gear. This requirement for tilting of the motor has required manual dexterity and has precluded automation of the assembly of the motor into the housing and has thus resulted in a relatively high cost for the servo actuator assembly in high volume mass production.

In addition, it has been required to accurately locate the motor in the housing to position the worm for proper engagement with the worm gear and to maintain the motor in this position when subjected to the axial thrust of the torque reaction from the driven gear on the motor shaft.

It has thus been found necessary to provide a limit stop in the motor housing for the axial movement of the motor shaft once the motor is installed in the housing. This limit stop acts as a thrust bearing during the operation of the motor under load; and, therefore the limit stop must be accurately located with respect to the front face of the motor upon assembly of the motor in the housing. Referring to FIG. 5, the motor is indicated at 1 with the limit stop denoted by reference numeral 2 and the registration surface for the front face of the motor denoted 3 with the control distance for locating the motor denoted by the character D.

Referring to FIG. 6, a known motor installation technique is indicated where the motor 4 has a spacer 5 provided between the front end face of the motor and the registration surface 3; and, the motor is retained thereon by threaded fasteners such as screws denoted by reference numeral 6. This type of assembly requires several manual operations at assembly and is deemed prohibitively costly for high volume mass production.

Referring to FIG. 7, another technique employed for mounting a servo motor 8 is illustrated wherein an undercut is provided in the stanchion 9 for supporting the rear end of the motor. Assembly of this arrangement requires tilting the motor.

Thus, it has been desired to provide an improved way or means of mounting a low voltage, high RPM relatively low torque direct current servo motor in a servo actuator housing in a manner which does not require manual operations for assembly of the motor and lends itself to automated assembly operations and thereby minimizes the manufacturing costs for high volume production.

BRIEF SUMMARY OF THE INVENTION

The present invention provides a way of mounting a low voltage, high RM. relatively low torque motor of the sub-fractional Horsepower variety in a servo actuator housing in a manner which permits the motor to be positioned with the motor shaft parallel to its installed orientation adjacent the housing and then moved in solely a single direction normal to the shaft to install the motor in its mounts. The invention particularly relates to motors intended to have a drive worm attached to the motor shaft for engagement with a driven gear as part of a speed reducer within the housing. The present invention employs a resiliently deflectable stanchion for supporting the back or rear end of the motor opposite the motor shaft and a front stanchion spaced from the rear stanchion which permits the motor to be moved in the single direction normal to the motor shaft into the stanchions in a snap locking engagement. The rear stanchion includes a cam surface thereon for deflecting the stanchion as the motor is inserted. The rear stanchion is operable to resiliently bias the installed motor in an axial direction to register the front face or shaft end of the motor against a registration surface on the front stanchion. The housing includes a limit stop or thrust bearing surface located to control axial movement of the motor shaft in operation. In the preferred practice the housing has the front and rear motor stanchions and limit stop molded as a one piece member.

DETAILED DESCRIPTION OF THE INVENTION

Figure 1:
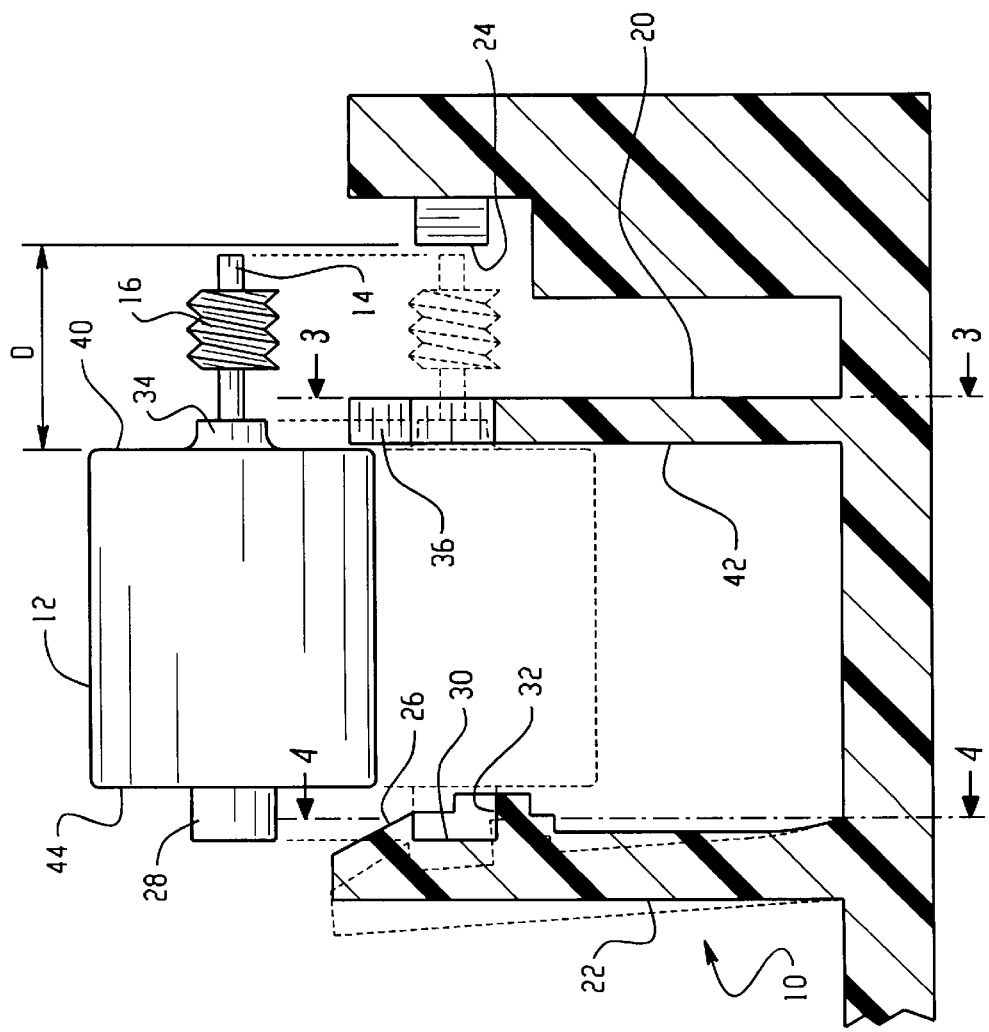
FIG. 1 is a cross-sectional view of a portion of a housing illustrating a motor disposed in position for assembly therein.

Referring to FIG. 1, a motor housing is indicated generally at 10 with a motor 12 disposed above immediately adjacent the housing and oriented for assembly therein as illustrated in solid outline.

The motor has an output shaft 14 which has mounted thereon a motor worm 16 for engagement with a driven gear (not shown) as part of a speed reducer to be provided in the motor housing.

Figure 2:
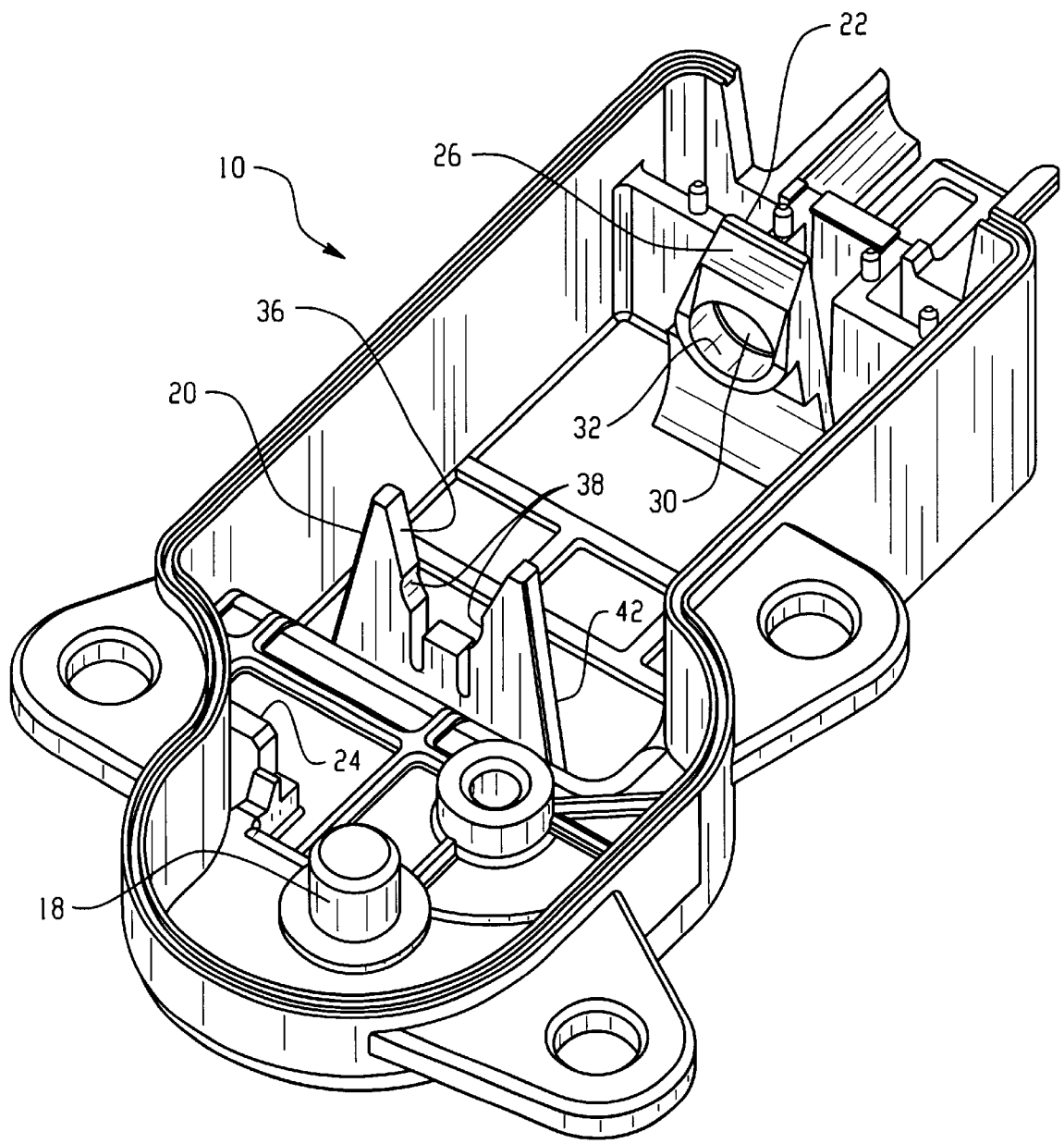
FIG. 2 is an axonometric view of the motor housing.
Figure 5:
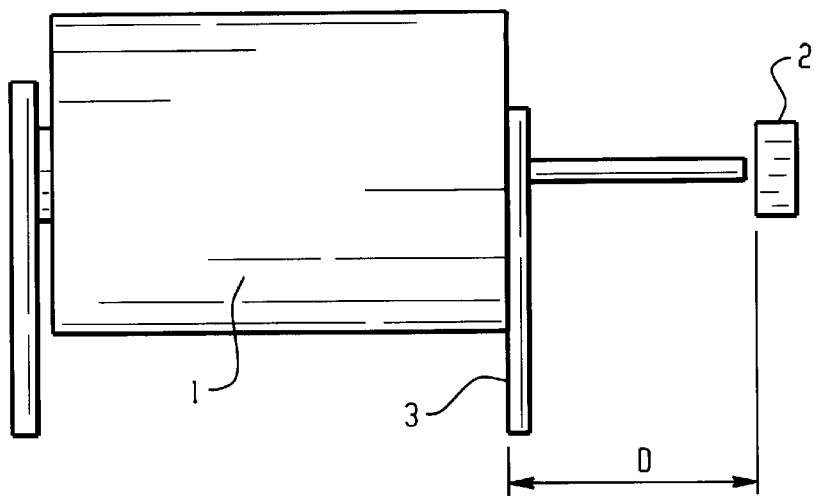
FIG. 5 is a pictorial schematic of a motor assembled in a housing.
Figure 6:
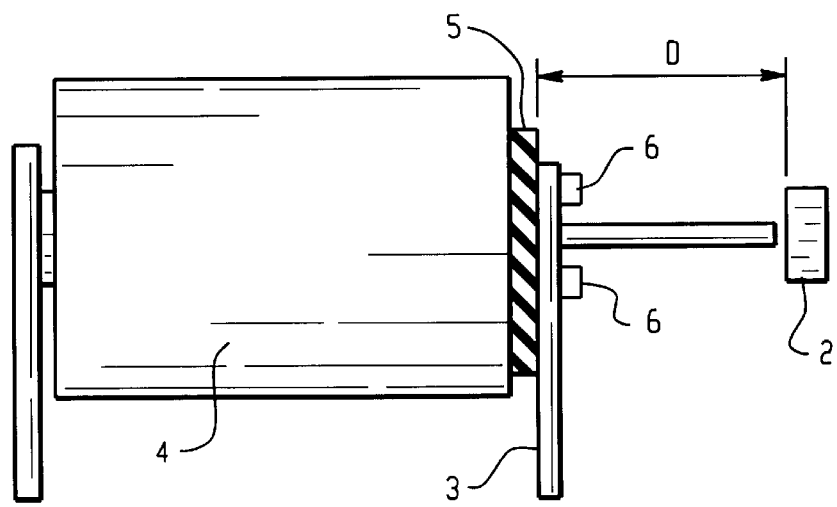
FIG. 6 is a schematic similar to FIG. 5 of one version of the prior art.
Figure 7:
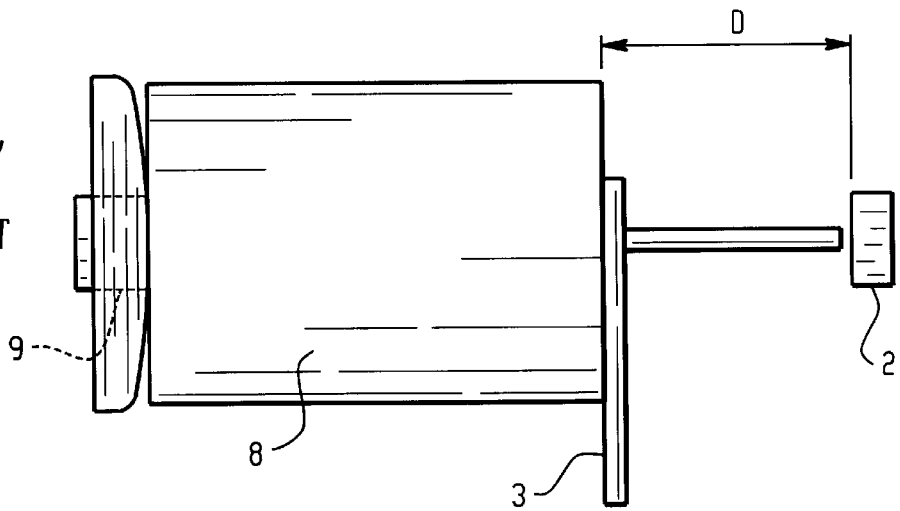
FIG. 7 is a view similar to FIG. 6 of another form of the prior art.

Referring to FIG. 2, the motor housing 10 is shown in axonometric view with a post 18 provided thereon for mounting of a gear (not shown) as part of a speed reducer to which the motor will be engaged. It will be understood that the housing 10 has a cover (not shown) which is installed after assembly of the servo actuator components in the housing 10. The housing 10 includes a front motor mounting stanchion 20 preferably formed integrally therewith and a rear motor mounting stanchion 22 also preferably formed integrally with the housing stanchion 20, 22 extend vertically from the bottom of the housing in spaced generally parallel relationship.

Although the stanchions 20, 22 are preferably both provided as part of housing 10, it will be understood that either or both may alternatively be formed as part of the housing cover (not shown).

Referring to FIGS. 1 through 4, a limit stop for axial movement of the motor shaft, where the motor is in the installed position, is illustrated and denoted by reference numeral 24 and is also preferably integrally molded in the housing 10.

Figure 3:
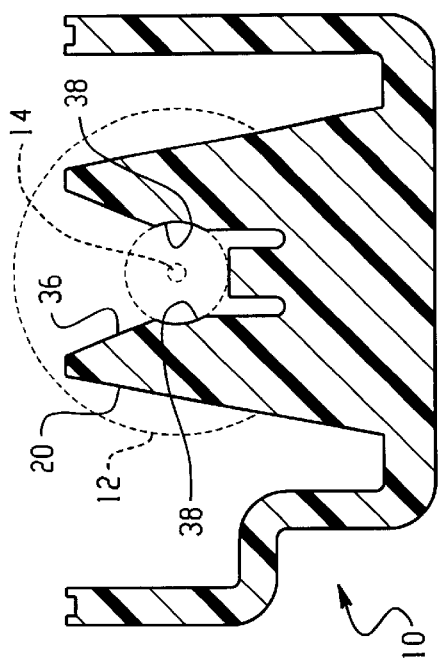
FIG. 3 is a section view taken along section-indicating lines 3—3 of FIG. 1.
Figure 4:
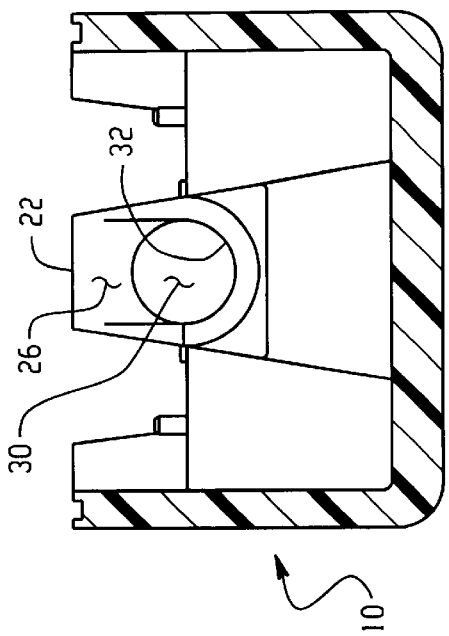
FIG. 4 is a section view taken along section-indicating lines 4—4 of FIG. 1.

The rear stanchion 22 has a camming surface 26 formed on the upper end thereof which surface is contacted by a rear bearing cap 28 on the motor 12 upon movement of the motor downwardly from the position shown in solid outline in FIG. 1 to the position shown in dashed outline therein. As the bearing cap 28 contacts camming surface 26 the stanchion 22 is resiliently deflected to the position shown in dashed outline; and, the bearing cap 28 snaps over camming surface 26 to enter into a recess 30 formed in the face of the stanchion 22. When the motor is in its installed position, the bearing cap 28 contacts a shoulder 32 formed about the recess in an arcuate configuration as illustrated in FIG. 4. Simultaneously, the front bearing flange 34 formed on the motor 12 is received in a slot 36 formed in the upper end of front motor stanchion 20 as shown in FIG. 3. The slot 36 has a detent surface 38 formed on both sides of the slot which effects a snap locking engagement of the front bearing flange 34 of the motor.

The front or shaft end face 40 of the motor is biased into registration with the inner or rear face 42 of the front stanchion 20 by the resilient spring action of the rear stanchion 22 bearing against the rear face 44 of the motor 12.

The motor, when registered against the surface 42 of front stanchion 20 thus provides the controlled distance D between the front face 40 of the motor and the limit stop for thrust bearing surface 24.

The present invention thus permits precision locating of a small high RPM low torque motor in a housing by positioning the motor with its shaft oriented parallel to the installed position and moving the motor solely in a single direction at right angles to the shaft directly into snap locking engagement with a housing; and, the motor drive worm into correct position for engagement with a driven gear. The present invention thus provides a method of mounting a small high RPM, low torque motor in a servo actuator in a manner which requires movement of the motor only in a single direction and thus is readily adaptable for automated assembly and elimination of manual operations thereby minimizing cost in high volume mass production.

Although the invention has hereinabove been described with respect to the illustrated embodiments, it will be understood that the invention is capable of modification and variation and is limited only by the following claims.

What is claimed is:

1. A method of mounting a servo motor having a rotating shaft in a housing comprising:
   (a) forming a housing having a first resiliently deflectable stanchion in said housing and forming a second stanchion spaced from the first stanchion;
   (b) forming a camming surface on said first stanchion and a motor engaging recess adjacent said camming surface;
   (c) forming a slot in the second stanchion and a detent surface in the slot;
   (d) positioning the motor adjacent said camming surface with the shaft at right angles to the first and second stanchions;
   (e) moving the motor in a direction at right angles to the axis of the shaft and against said camming surface and deflecting the first stanchion and disposing a first portion of the motor in said motor engaging recess;
   (f) simultaneously moving a second end of the motor distal the first end into engagement with said detent with the motor shaft extending through the slot; and,
   (g) biasing the motor in an axial direction into contact with the second stanchion by resilient contact of the first stanchion with the motor wherein said step of forming a housing includes forming a limit stop for limiting axial movement of the motor shaft with the motor in axial contact with said second stanchion.

2. The method defined in claim 1, wherein the step of disposing a first portion of the motor in the motor engaging recess includes snap locking.

3. The method defined in claim 1, wherein the step of moving the second motor portion into contact with the detent includes snap locking.

4. The method defined in claim 1, wherein the step of forming a housing includes forming the first and second stanchions therewith as one piece.

5. The method defined in claim 1, wherein the step of forming a housing includes molding a one piece member.

6. The method defined in claim 1, wherein the step of molding includes molding a one-piece member of glass filed polypropylene material.

* * * * *